(12) United States Patent
Phillips, III

(10) Patent No.: US 7,783,031 B2
(45) Date of Patent: Aug. 24, 2010

(54) METHOD FOR TRANSLATING A DIALED STRING ENTERED BY A CALLING PARTY

(75) Inventor: Robert V. Phillips, III, Matawan, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 11/403,529

(22) Filed: Apr. 13, 2006

(65) Prior Publication Data
US 2006/0182263 A1 Aug. 17, 2006

Related U.S. Application Data

(63) Continuation of application No. 10/231,597, filed on Aug. 30, 2002, now abandoned.

(51) Int. Cl.
*H04M 3/42* (2006.01)
(52) U.S. Cl. .............. 379/350; 379/216.01; 379/355.01
(58) Field of Classification Search .. 379/355.01–355.1
See application file for complete search history.

(56) References Cited

U.S. PATENT DOCUMENTS 6,453,018 B2 9/2002 Henry et al.
6,477,247 B1 * 11/2002 Burg et al. ................. 379/354
6,643,369 B1 11/2003 DiMarco \* cited by examiner

*Primary Examiner*—Walter F Briney, III
(74) *Attorney, Agent, or Firm*—Joseph B. Ryan; Jason Paul DeMont; Wayne S. Breyer

(57) ABSTRACT

A method and apparatus are disclosed for automatically translating the dialed string entered by a calling party to identify a called party into another dialed string. The string translation may be based, for example, on characteristics of the telephone number or telephone terminal of the calling party or characteristics of the call itself. Translation rules translate the dialed string entered by the calling party to another dialed string. Each translation rule contains one or more conditions and a corresponding action item that should be performed to translate the dialed string when the rule is satisfied. The improved abbreviated dialing feature allows a shorter sequence of digits dialed from any telephone connected to a compliant switch to be replaced by a longer dialed string.

11 Claims, 3 Drawing Sheets

DIALED STRING TRANSLATION RULEBASE – 300

| | TRIGGER CONDITIONS | | ACTION ITEMS | | |
|---|---|---|---|---|---|
| RULE IDENTIFIER 340 | MATCH PREFIX 345 | LENGTH 350 | DELETE PREFIX LENGTH 355 | INSERT PREFIX 360 | MORE CONVERSION? 370 |
| 305 — 0001 | 3 | 4 | 1 | AAAA | NO |
| 310 — 0002 | 2 | 3 | 1 | AAAAA | YES |
| ⋮ | ⋮ | ⋮ | ⋮ | ⋮ | ⋮ |
| 315 — NNNN | 4 | 5 | 1 | AAA | NO |

FIG. 3

DIALED STRING TRANSLATION RULEBASE – 300

| RULE IDENTIFIER 340 | TRIGGER CONDITIONS | | ACTION ITEMS | | |
| --- | --- | --- | --- | --- | --- |
| | MATCH PREFIX 345 | LENGTH 350 | DELETE PREFIX LENGTH 355 | INSERT PREFIX 360 | MORE CONVERSION? 370 |
| 0001 | 3 | 4 | 1 | AAAA | NO |
| 0002 | 2 | 3 | 1 | AAAAA | YES |
| ... | ... | ... | ... | ... | ... |
| NNNN | 4 | 5 | 1 | AAA | NO |

305 — row 0001
310 — row 0002
315 — row NNNN

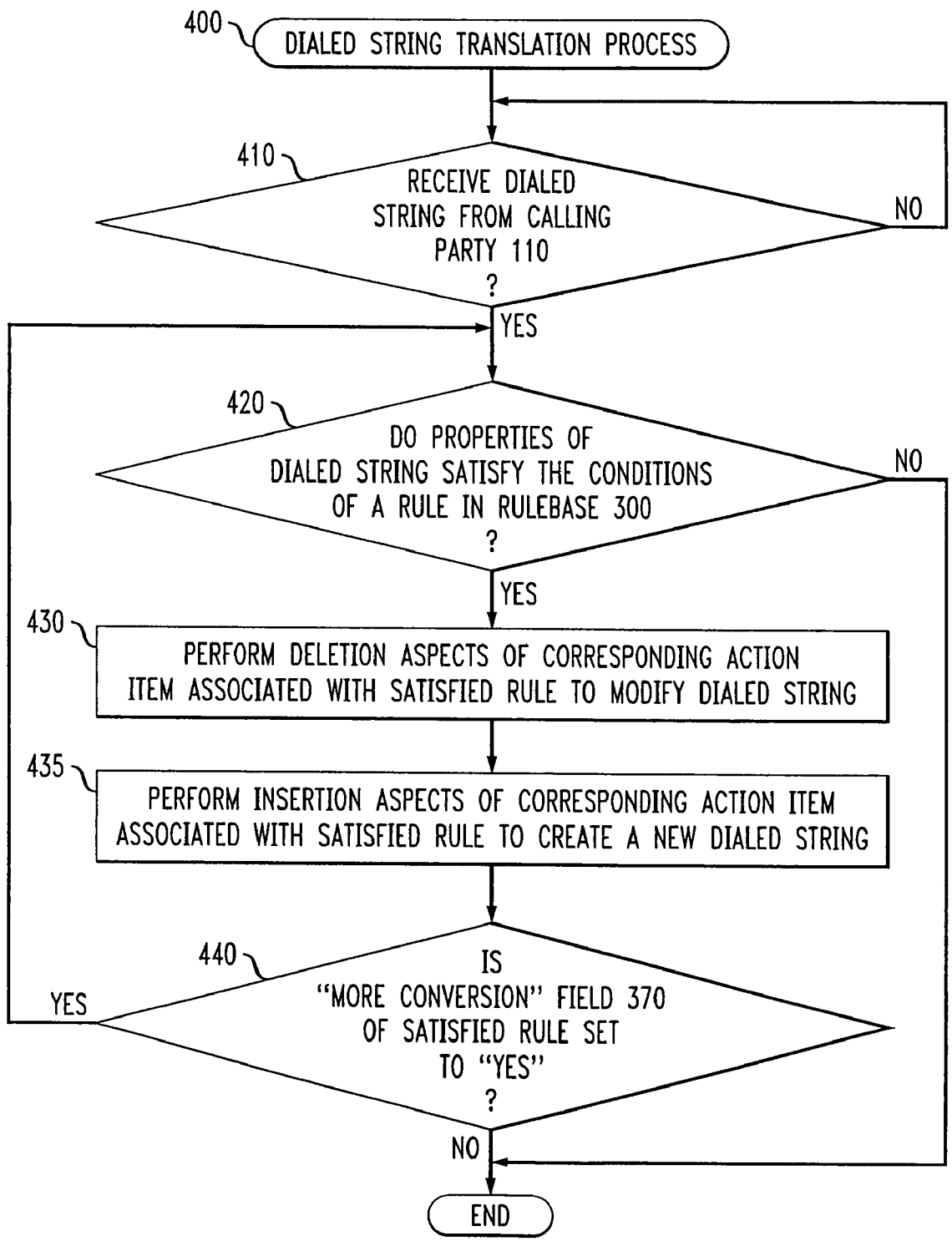

US 7,783,031 B2

METHOD FOR TRANSLATING A DIALED STRING ENTERED BY A CALLING PARTY

CROSS-REFERENCE TO RELATED APPLICATION

The present application is a continuation application of U.S. patent application Ser. No. 10/231,597, Aug. 30, 2002, now abandoned.

FIELD OF THE INVENTION

The present invention relates generally to call processing techniques, and more particularly, to methods and apparatus for translating a dialed string of a called party to another dialed string.

BACKGROUND OF THE INVENTION

A calling party that desires to contact a called party over a communication network typically indicates the telephone number of the called party using a dialed string that is entered using a keypad on the telephone of the calling party. The dialed string is a sequence of numbers (or symbols) that identifies the telephone of the called party on the communication network. In the United States, for example, a telephone number typically consists of ten digits (i.e., a three digit area code and a seven digit local number).

It is often difficult, however, for a person to remember a ten digit telephone number for each of his or her acquaintances, especially as individuals increasingly have more than one associated telephone number (such as numbers for their telephone, facsimile and cellular telephone). In addition, even when a given telephone number can be recalled, the act of dialing a ten digit string takes time and is error prone, especially for longer dialed strings. Thus, a number of techniques have been proposed or suggested for reducing the length of a dialed string that a calling party must enter to identify a called party.

In an enterprise network, for example, such as a private branch exchange (PBX) switch of a corporation, users are typically assigned an n digit telephone extension within a range of numbers. For example, a given corporation may be assigned a range of telephone numbers, such as 732-555-0001 through 732-555-9999, and the employees located in a given corporate location may each be assigned a unique four-digit telephone extension within the range of numbers. Typically, the company's private branch exchange switch would be programmed so that employees can dial one another internally with only five digits (such as a leading "5," followed by the four-digit extension of the called party). However, external callers must still dial the complete telephone number of a called party.

In addition, a number of telephone systems provide an "abbreviated dialing" feature that allows users to create their own list of abbreviated dial strings. Each abbreviated dial string has a corresponding longer dial string. Once a user has defined a list of abbreviated dial strings, the user can access the abbreviated dialing feature, for example, by depressing a special "feature access button" or by entering a "*" symbol, followed by the desired abbreviated dial string. In this manner, the longer dial string associated with the entered abbreviated dial string is used as if the calling party had actually dialed the longer dial string. Abbreviated dialing features, however, require each user to create their own list of abbreviations. In addition, a given user can only access his or her defined abbreviated dial strings from the user's own telephone (unless another telephone has been programmed in the same manner).

A need therefore exists for techniques for reducing the length of a dialed string that must be entered to identify a called party. A further need exists for an improved method and apparatus for translating a dialed string of a called party to another dialed string.

SUMMARY OF THE INVENTION

Generally, a method and apparatus are disclosed for automatically translating the dialed string entered by a calling party to identify a called party into another dialed string. The string translation may be based, for example, on characteristics of the telephone number of the calling party, the call itself, or of the telephone terminal associated with the calling or called parties. For example, a dialed string translation in accordance with the present invention can allow a calling party to enter the last three digits of a called party. Thereafter, the original dialed string is automatically translated by appending the first four digits of the calling party to create a seven digit called number or by appending the first seven digits of the calling party to create a 10digit called number. As used herein, the term "append" shall include appending a prefix, suffix or intermediate number into a dialed string.

In an exemplary rule-based implementation, one or more translation rules are defined to translate the dialed string entered by the calling party into another dialed string. Each translation rule contains one or more conditions and a corresponding action item that should be performed to translate the dialed string when the rule is satisfied. The conditions may include a specified prefix and length of the dialed string. Thus, a dialed string is analyzed to determine if it has the prefix and length specified by any translation rule. If the properties of the dialed string satisfy the trigger conditions of a translation rule, then the corresponding action item associated with the satisfied rule is performed to create a new dialed string. The action items may include deleting one or more symbols from the original dialed string and appending one or more symbols to create a new dialed string. The appended symbols may be derived from, for example, the leading digits of a telephone extension of the calling party or of a corporate facility. In this manner, the present invention provides an improved abbreviated dialing feature that allows a shorter sequence of digits dialed from any telephone connected to a compliant switch to be replaced by a longer dialed string.

A more complete understanding of the present invention, as well as further features and advantages of the present invention, will be obtained by reference to the following detailed description and drawings.

BRIEF DESCRIPTION OF THE DRAWINGS

FIG. 3 is a sample record from an exemplary dialed string translation rulebase incorporating features of the present invention; and FIG. 4 is a flow chart describing an exemplary implementation of the dialed string translation process incorporating features of the present invention.

DETAILED DESCRIPTION

Figure 1:
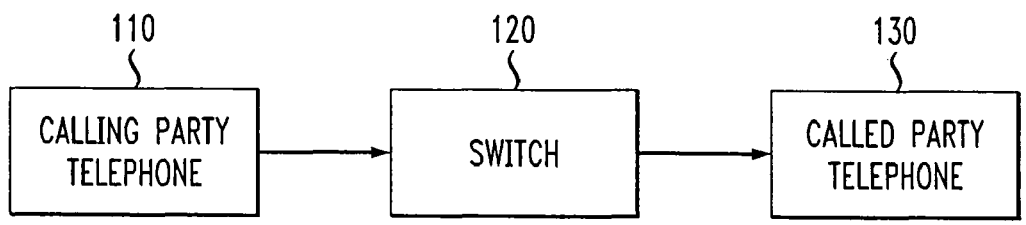
FIG. 1 illustrates an exemplary network environment in which the present invention can operate.

FIG. 1 illustrates an exemplary network environment in which the present invention can operate. As shown in FIG. 1, a calling party 110 calls a called party 130 and the call is routed through at least one switch 120, discussed below in conjunction with FIG. 2. According to one aspect of the present invention, the dialed string entered by the calling party 110 to identify a called party 130 is translated to another dialed string, based, for example, on characteristics of the telephone number or telephone terminal of the calling party 110 or characteristics of the call. For example, the present invention provides an improved abbreviated dialing feature that allows a shorter sequence of dialed digits to be replaced by a longer dialed string.

While the present invention is illustrated below in conjunction with the processing of calls in an exemplary enterprise communication system, the present invention is not limited to use with any particular configuration of system elements or communication processing application. Those skilled in the art will recognize that the disclosed techniques may be used in any communication system application in which it is desirable to provide enhanced abbreviated dialing feature. Thus, the term "switch" as used herein should be understood to include a private-branch exchange (PBX) system, an enterprise switch, or other type of public or private telecommunications system switch, as well as other types of processor-based communication control devices. The term "call" as used herein is intended to include not only incoming or outgoing telephone calls but also non-telephonic communications such as data transmissions, voice-over-IP, e-mail or facsimile.

Figure 2:
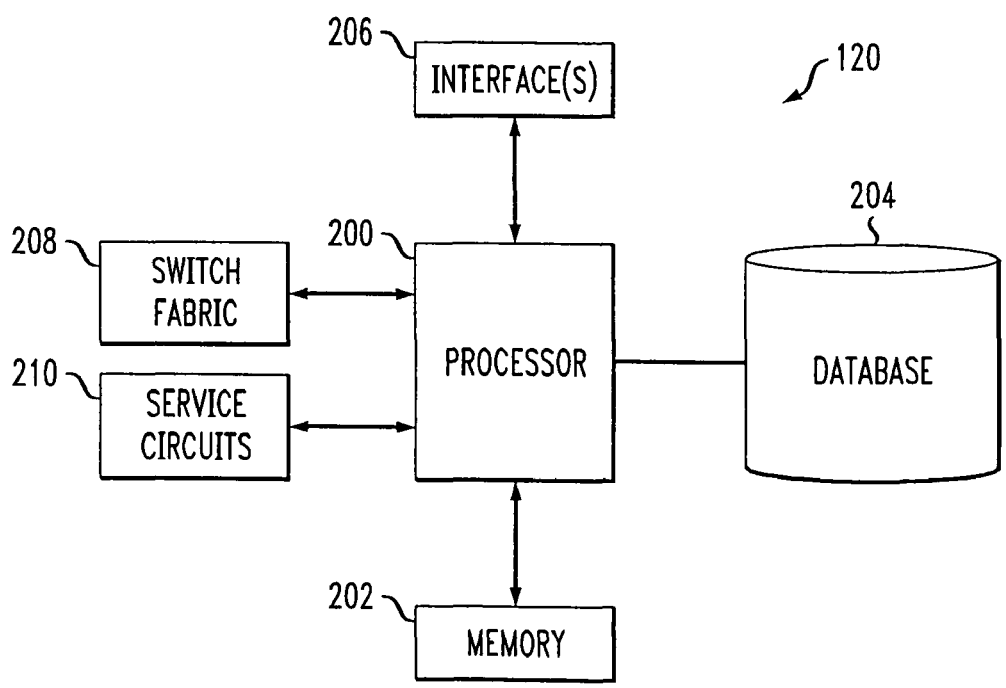
FIG. 2 is a schematic block diagram of an exemplary switch incorporating features of the present invention.

FIG. 2 is a schematic block diagram of an exemplary switch 120 incorporating features of the present invention. The switch 120 may be embodied, for example, as a DEFINITY® Enterprise Communication Service (ECS) communication system switch, available from Avaya Inc. of Basking Ridge, N.J., USA, as modified herein to provide the features and functions of the present invention. While the present invention is illustrated in the context of a PBX switch, other types of known switches may be utilized, as modified herein to support the features and functions of the present invention. In particular, such known switches must be extended to support the translation of a dialed string entered by a calling party with a different dialed string in accordance with the present invention. The conventional aspects of such switches are well known in the art and therefore not described in detail herein. The switch 120 may be connected to one or more external endpoints, e.g., external terminals or system processing elements, via a network (not shown) or other suitable communication channel(s).

As shown in FIG. 2, the exemplary switch 120 includes a processor 200, a memory 202, a database 204, one or more interfaces 206, a switch fabric 208, and a set of service circuits 210. The processor 200 may be implemented as, a central processing unit (CPU), microprocessor, application-specific integrated circuit (ASIC) or other type of digital data processor, as well as various portions or combinations of such elements. The memory 202 may be a random access memory (RAM), a read-only memory (ROM) or combinations of these and other types of electronic memory devices.

The processor 200 operating in conjunction with the memory 202 executes one or more software programs for providing processing and other functions within the switch 120. Such programs may be stored in memory 202 or another storage device accessible to the switch 120 and executed by processor 200 in a conventional manner. For example, as discussed below in conjunction with FIG. 4, the memory 202 may store a dialed string translation process 400 incorporating features of the present invention. The dialed string translation process 400 incorporates features of the present invention to translate the dialed string entered by the calling party 110 to another dialed string.

The database 204 may be, e.g., an optical or magnetic disk-based storage device, or other conventional storage device associated with or otherwise accessible to the switch 120. The database 204 may be used to store, e.g., feature assignments to particular feature buttons or codes, directory number assignments to corresponding call appearances or direct facility termination keys, access restrictions, and other administrative information regarding the configuration of the system, as well as other types of information. For example, as discussed below in conjunction with FIG. 3, the database 204 may store a dialed string translation rulebase 300 incorporating features of the present invention. The dialed string translation rulebase 300 records one or more rules that are used in accordance with one embodiment of the present invention to translate the dialed string entered by the calling party 110 to another dialed string.

The service circuits 210 may include tone generators, announcement circuits, etc. These circuits and the interfaces 206 are controlled by processor 200 in implementing call processing functions in the switch 120. The switch 120 may include additional elements that are omitted from FIG. 2 for simplicity and clarity of illustration. For example, the switch may include a port card for each type of user terminal associated therewith. In addition, it will be appreciated by those skilled in the art that the switch 120 may be configured to support multiple user terminals of different types, e.g., wired deskset terminals, wireless deskset terminals, personal computers, video telephones or other advanced terminals, etc. Also associated with the switch 120 may be an administrator terminal (not shown) that is used to program the operation of the switch 120 during a system administration, e.g., an initial set-up and configuration of the system or a subsequent system-level or user-level reconfiguration.

Other devices not shown in the figures may be associated with the switch 120, such as an adjunct feature server. Such an adjunct may be physically incorporated within the switch, and may be partially or completely implemented using other switch elements such as processor 200 and memory 202.

FIG. 3 is a sample record from an exemplary dialed string translation rulebase 300 incorporating features of the present invention. As previously indicated, the dialed string translation rulebase 300 records one or more rules that are used in accordance with the present invention to translate the dialed string entered by the calling party 110 to another dialed string. The rules may be based, for example, on characteristics of the telephone number or telephone terminal of the calling party 110 or characteristics of the call.

As shown in FIG. 3, the dialed string translation rulebase 300 includes one or more, records, such as records 305-315, each associated with a different rule. For each rule identified in field 340, the exemplary dialed string translation rulebase 300 identifies the trigger conditions associated with the rule in fields 345 and 350 and the corresponding action item that should be performed when the rule is triggered in fields 355 and 360. In addition, the dialed string translation rulebase 300 optionally indicates in field 370 whether further conversion should be performed once a given rule is implemented.

The manner in which the rules recorded in the dialed string translation rulebase 300 are used to translate dialed strings is discussed further below in conjunction with FIG. 4. For example, the rule in record 305 of the dialed string translation rulebase 300 indicates that the first symbol from the dialed string should be deleted, and thereafter a four digit prefix (AAAA) should be inserted. In the exemplary embodiment, the inserted four digit prefix (AAAA) is the first four digits of the telephone extension of the calling party 110. In a further variation, the rule in record 305 of the dialed string translation rulebase 300 could have a related rule (not shown) indicating that the first symbol from the dialed string should be deleted, and an alternate four digit prefix (BBBB) should be inserted. In this manner, the four digit prefix (AAAA) could be, for example, the first four digits of a primary telephone extension of the calling party 110 and the alternate four digit prefix (BBBB) could be, for example, the first four digits of a secondary telephone extension of the calling party 110 or a number that has been programmed into the terminal and accessed using a function or feature button on the telephone.

In yet another variation, the four digit prefix (AAAA) could be, for example, the first four digits of one corporate facility and the alternate four digit prefix (BBBB) could be, for example, the first four digits of another corporate facility. In yet another variation, the four digit prefix could be expressed as (CCCC), or another variable name, such as (C4), because the symbols to represent this value could be practically anything, and may represent, for example, the first four digits of the last telephone number dialed from the telephone; or another 'variable name' may be created to represent the first four digits of any particular number of many that may be associated with the calling telephone in the database 204 in FIG. 2. The desired four digit prefix (AAAA) or (BBBB) (or any other variable name used to represent a prefix of symbols to be inserted into the dialed string.) could be accessed, for example, using a corresponding leading prefix (as defined in field 345 of the dialed string translation rulebase 300) or by pressing a corresponding feature button on the telephone before entering the dialed string.

It is noted that while the features and functions of the present invention are illustrated as being implemented by the switch 120, such features and functions could alternatively be deployed in the telephones of each calling party 110, as would be apparent to a person of ordinary skill in the art. Thus, the values recorded in the dialed string translation rulebase 300 can be programmed, for example, by an administrator of the switch 120 or by a given user, depending on whether the present invention is implemented in the switch 120 or the telephone of each calling party 110. An implementation in the switch 120 allows centralized maintenance of the dialed string translation rulebase 300, among other benefits. Of course, the invention may be implemented both in the telephone of some calling parties and in the switch 120 to which it connects, each using either the same or different rulebases as the other.

It is further noted that a conventional switch 120 typically provides an inter-digit dialing timer feature that waits a predefined interval for the next number until a certain number of minimum digits are dialed. The inter-digit dialing timer feature can be suppressed in accordance with the present invention when the leading digit matches one of the matching prefixes specified in field 345 of the dialed string translation rulebase 300 by, for example, the caller dialing a specified symbol, such as '#', after dialing the last digit.

FIG. 4 is a flow chart describing an exemplary implementation of the dialed string translation process 400, incorporating features of the present invention. As previously indicated, the exemplary dialed string translation process 400 employs the dialed string translation rulebase 300 to translate the dialed string entered by the calling party 110 to another dialed string. As shown in FIG. 4, the dialed string translation process 400 is initiated during step 410 when a dialed string is received from a calling party 110.

A test is performed during step 420 to determine if the properties of the dialed string satisfy the trigger conditions of a rule in the dialed string translation rulebase 300. In other words, the dialed string is analyzed to determine if it has the prefix and length specified by any of the rules in the dialed string translation rulebase 300. For example, if the calling party 110 enters the dialed string "3123," the dialed string translation process 400 checks the length of the dialed string and the "match prefix" string for each row in the table 300 and seeks a match. The "match prefix" string matches the dialed string if the "match prefix" symbols of length N match the first N symbols in the dialed string.

If it is determined during step 420 that the properties of the dialed string satisfy the trigger conditions of a rule in the dialed string translation rulebase 300, then the deletion aspects of the corresponding action item associated with the satisfied rule are performed during step 430 to modify the original dialed string. Thereafter, the insertion aspects of the corresponding action item associated with the satisfied rule are performed during step 435 to create the new dialed string. In the present example, the dialed string "3123" satisfies the trigger conditions of the rule in record 305 of the dialed string translation rulebase 300. The rule in record 305 of the dialed string translation rulebase 300 indicates that the first symbol from the dialed string should be deleted, and thereafter a four digit prefix (AAAA) should be inserted. In the exemplary embodiment, the inserted four digit prefix (AAAA) is the first four digits of the telephone extension of the calling party 110.

Continuing the above example, if the telephone number of the calling party 110 is 555-9001, the resulting dialed string created by rule 305 would be 555-9123. Thus, rule 305 enables any calling party 110 whose telephone extension begins with the same four digits as the called party 130 to dial the number "3," followed by the last three digits of the telephone number of the called party 130. Similarly, the rule in record 310 allows a calling party 110 whose telephone extension begins with the same five digits as the called party 130 to dial the number "2," followed by the last two digits of the telephone number of the called party 130. Likewise, the rule in record 315 allows a calling party 110 whose telephone extension begins with the same three digits as the called party 130 to dial the number "4," followed by the last four digits of the telephone number of the called party 130.

A further test is performed during step 440 to determine if the "more conversion" field 370 of the satisfied rule is set to "yes." The "more conversion" field 370 indicates that the resulting dialed string created during step 430 should be compared to the rules in the dialed string translation rulebase 300. If it is determined during step 440 that the "more conversion" field 370 of the satisfied rule is set to "yes," then program control returns to step 420 to determine if the resulting dialed string satisfies any rules in the dialed string translation rulebase 300. If, however, it is determined during step 440 that the "more conversion" field 370 of the satisfied rule is set to "no," then program control terminates.

If, however, it was determined during step 420 that the properties of the dialed string do not satisfy the trigger conditions of a rule in the dialed string translation rulebase 300, then the call is processed in a conventional manner before program control terminates.

It is to be understood that the embodiments and variations shown and described herein are merely illustrative of the principles of this invention and that various modifications may be implemented by those skilled in the art without departing from the scope and spirit of the invention.

The invention claimed is:

1. A method comprising:
   receiving a first string by a switch from a telephone terminal, wherein:
   (i) the telephone terminal is identified by a calling party telephone number, and
   (ii) the first string comprises fewer digits than the switch requires for a called party's telephone number;
   applying by the switch a first rule of translation without prompting a user at the telephone terminal for additional information, wherein the first rule of translation comprises an indication that a second rule of translation is to be applied;
   when the first string satisfies a trigger condition of the first rule of translation, translating by the switch the first string into a second string;
   when the second string satisfies a trigger condition of the second rule of translation, translating by the switch the second string into a third string; and
   establishing a telephone call from the switch based on the third string as the called party's telephone number.

2. The method of claim 1 wherein translating the first string into the second string comprises appending at least a portion of the calling party telephone number to generate the second string.

3. The method of claim 1 wherein translating the second string into the third string comprises appending at least a portion of the calling party telephone number to generate the third string.

4. The method of claim 1 wherein the first rule of translation is based at least in part on a characteristic of the call.

5. The method of claim 1 wherein the first rule of translation is based at least in part on the type of the telephone terminal.

6. A method comprising:
   providing a switch comprising a first rule of translation, wherein the first rule indicates whether a second rule of translation is to be applied;
   providing a terminal that is connected to the switch and has an identifying telephone number;
   analyzing within the switch a first string dialed at the terminal without prompting a user at the terminal for additional information, wherein the first string comprises fewer digits than the switch requires for a called party's telephone number;
   when the first string satisfies a trigger condition of the first rule of translation, translating within the switch from the first string to a second string according to the first rule;
   when the first rule indicates that the second rule is to be applied and the second string satisfies a trigger condition of the second rule, translating within the switch from the second string to a third string according to the second rule; and
   establishing by the switch a telephone call from the terminal to a first telephone number that comprises the third string.

7. The method of claim 6 wherein a portion of the identifying telephone number of the terminal is appended to all or part of the first string to form the second string.

8. The method of claim 6 wherein a portion of the identifying telephone number of the terminal is appended to all or part of the first string to form the third string.

9. The method of claim 6 wherein the first rule of translation is based at least in part on a characteristic of the call.

10. The method of claim 6 wherein the first rule of translation is based at least in part on the type of the telephone terminal.

11. The method of claim 6 further comprising:
    when the trigger condition of the first rule is that the first string immediately follows a second telephone number that was dialed at the telephone terminal,
    appending at least a portion of the first string to a portion of the second telephone number to create the second string in accordance with the first rule.

* * * * *